United States Patent
Klar

(10) Patent No.: US 10,202,082 B2
(45) Date of Patent: Feb. 12, 2019

(54) AUTOMOBILE ROOFTOP MOUNT

(71) Applicant: Trendsformers, LLC, New York, NY (US)

(72) Inventor: David Klar, West Orange, NJ (US)

(73) Assignee: TRENDSFORMERS, LLC, New York, NY (US)

( * ) Notice: Subject to any disclaimer, the term of this patent is extended or adjusted under 35 U.S.C. 154(b) by 0 days.

(21) Appl. No.: 15/732,396

(22) Filed: Nov. 6, 2017

(65) Prior Publication Data

US 2018/0134227 A1    May 17, 2018

Related U.S. Application Data

(60) Provisional application No. 62/496,977, filed on Nov. 4, 2016.

(51) Int. Cl.
*B60R 9/045*   (2006.01)
*B60R 9/058*   (2006.01)

(52) U.S. Cl.
CPC .............. *B60R 9/045* (2013.01); *B60R 9/058* (2013.01)

(58) Field of Classification Search
CPC .......... B60R 9/045; B60R 9/058; B60R 9/048
USPC ........................................ 224/321, 324, 329
See application file for complete search history.

(56) References Cited

U.S. PATENT DOCUMENTS

| | | | | |
|---|---|---|---|---|
| 2,836,914 A | * | 6/1958 | Nelson | G09F 21/04 16/348 |
| 3,009,615 A | * | 11/1961 | Baxter | B60N 3/001 108/129 |
| 3,075,311 A | * | 1/1963 | Maillette | G09F 21/04 40/502 |
| 6,796,063 B1 | * | 9/2004 | Bryant | G09F 17/00 116/51 |
| 9,623,795 B2 | * | 4/2017 | Bowe | B60Q 1/2615 |
| 2005/0274756 A1 | * | 12/2005 | Seys | B60R 9/04 224/319 |
| 2010/0199534 A1 | * | 8/2010 | Larsen | G09F 7/18 40/591 |
| 2011/0290171 A1 | * | 12/2011 | Brick | E04H 12/2238 116/173 |
| 2016/0346141 A1 | * | 12/2016 | Guertler | A61G 3/0808 |

* cited by examiner

*Primary Examiner* — Brian D Nash
(74) *Attorney, Agent, or Firm* — Jonathan E. Grant; Grant Patent Services

(57) ABSTRACT

The present disclosure teaches a device and method of vertically mounting a selected item on the roof of a automobile. The item may be put in a horizontal position when entering a garage or tunnel. The item may be a Christmas tree, a menorah, an oversized football helmet, ball, or anything else that can be positioned on a pole.

15 Claims, 21 Drawing Sheets

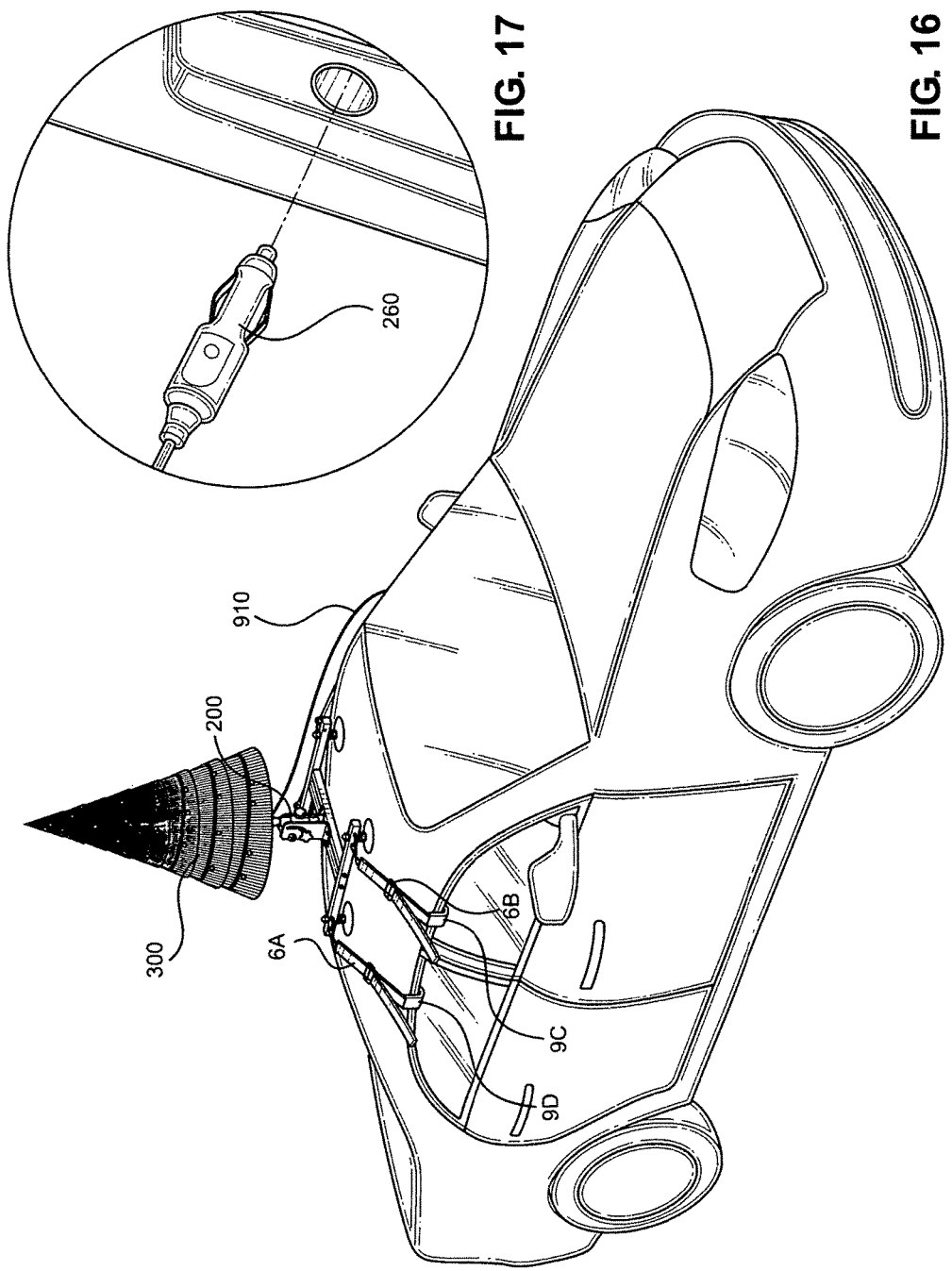

AUTOMOBILE ROOFTOP MOUNT

This application claims priority to U.S. provisional application 62/496,977, filed Nov. 4, 2016, incorporated herein in its entirety.

An automobile rooftop mount is disclosed, which can support Christmas trees, banners, menorahs, and other devices.

BRIEF DESCRIPTION OF THE FIGURES

FIG. 12 is a frontal perspective view of the

FIG. 16 is a perspective view of the positioning of the Christmas tree and rooftop mount on top of the automobile;

FIG. 17 is a perspective view showing the adapter;

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION OF THE DISCLOSURE

The present disclosure teaches a roof mount and a method of mounting on the roof of an automobile. In one embodiment, the roof mount may be put in a horizontal position when entering a garage or tunnel. The item may be a Christmas tree, a menorah, an oversized football helmet, ball, or anything else that can be positioned on a pole.

Figure 1:
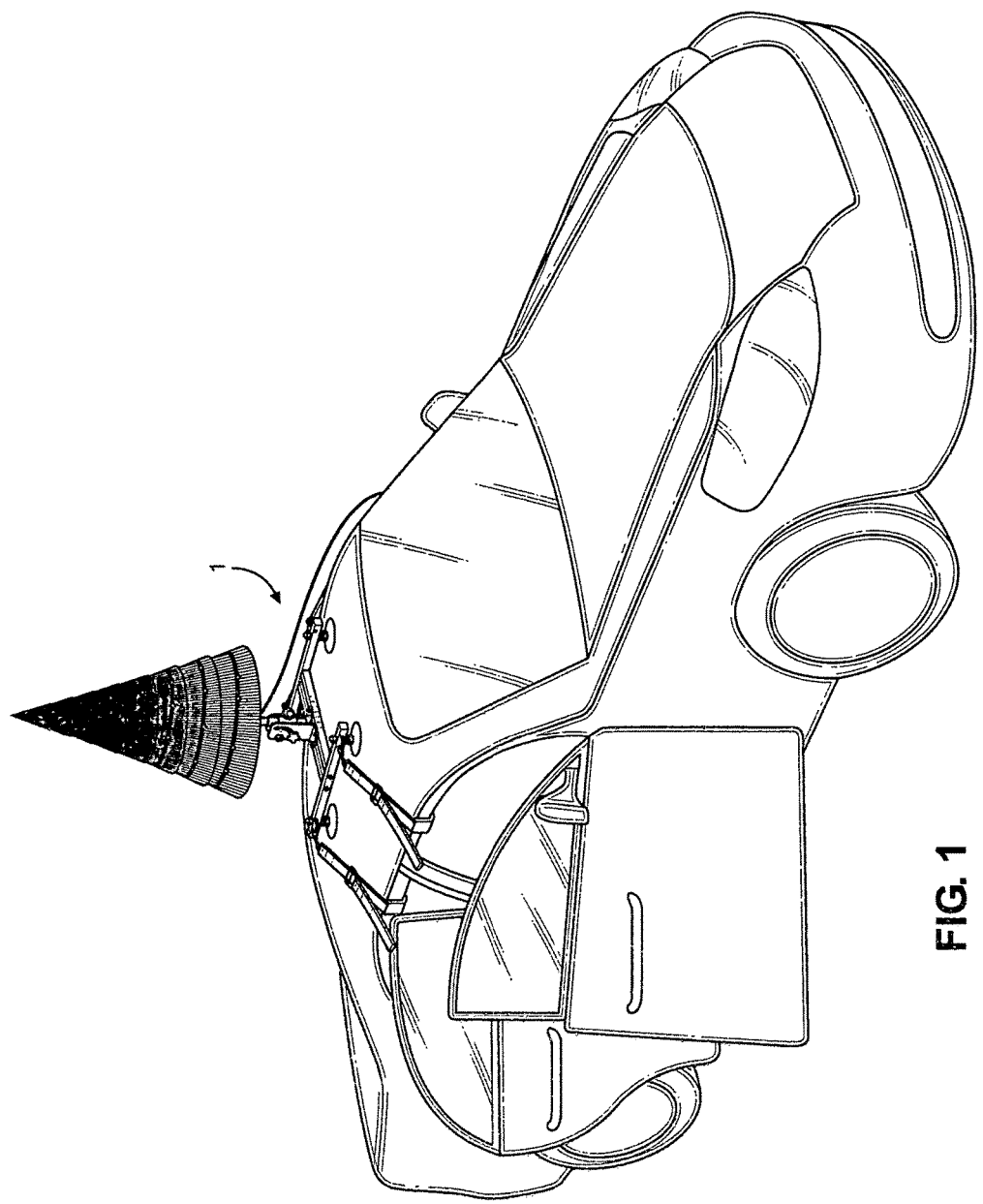
FIG. 1 is an overhead perspective view of the roof top mount in use.
Figure 2:
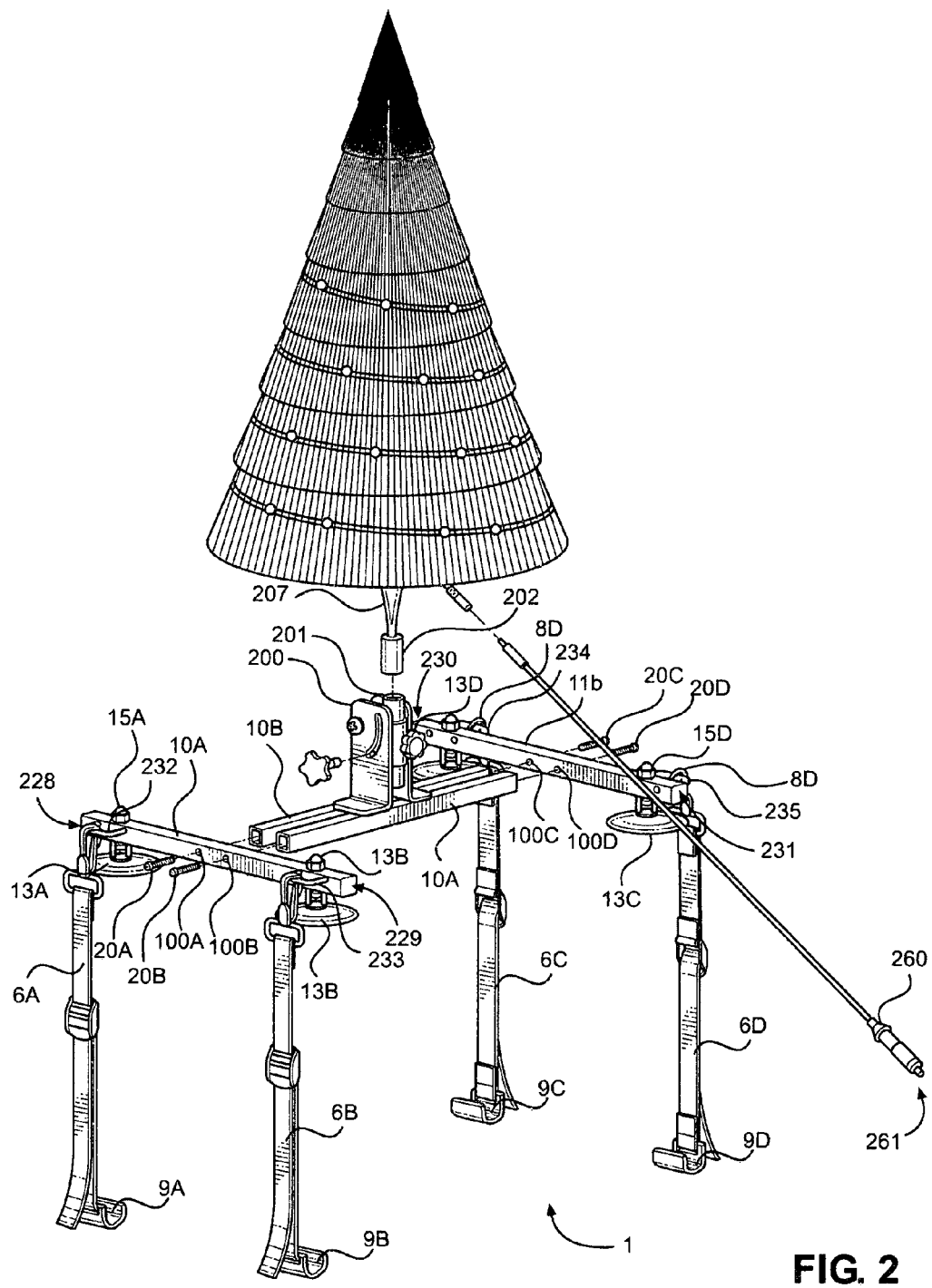
FIG. 2 is an exploded view of the rooftop mount, which shows a Christmas tree attachment.
Figure 3:
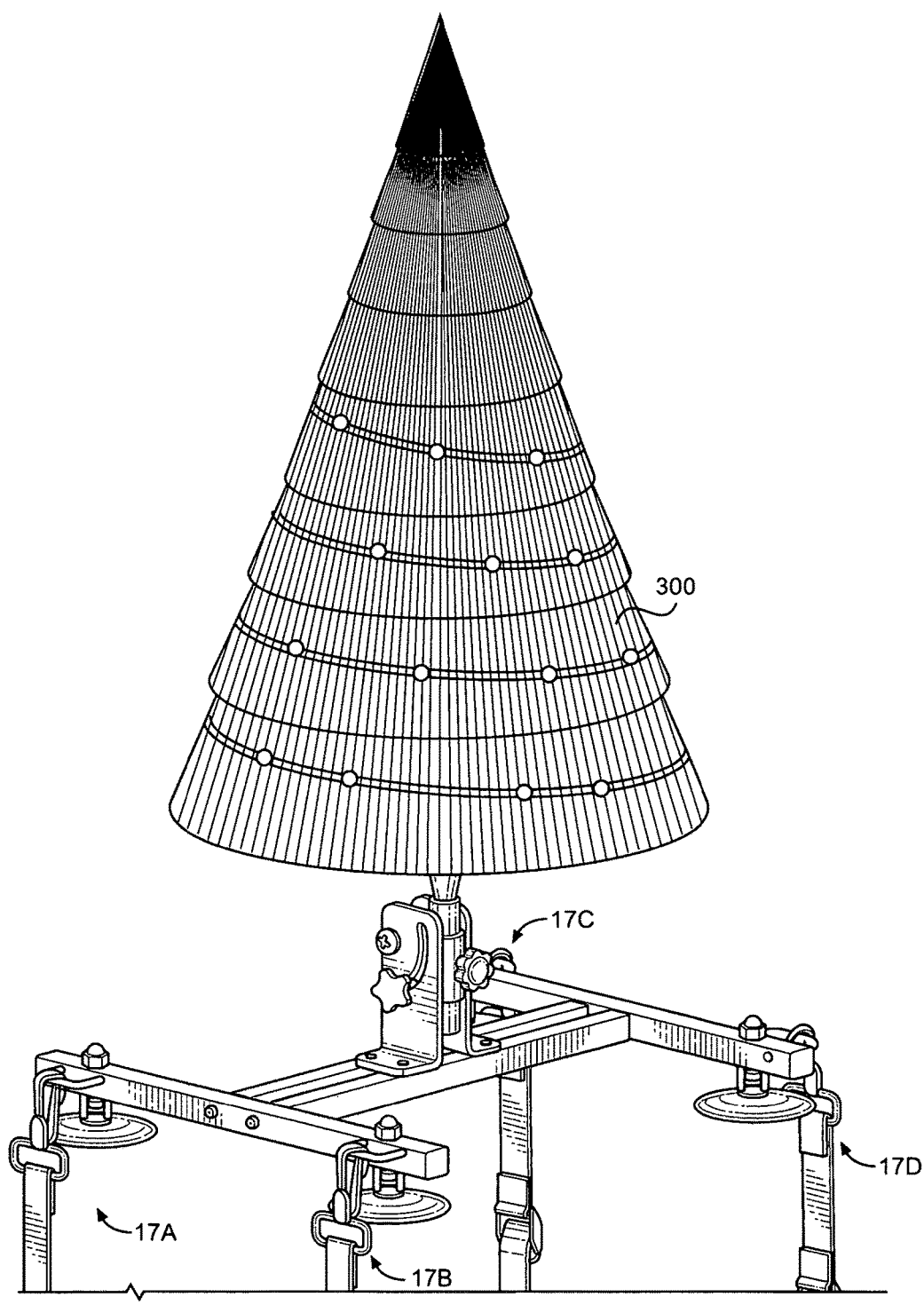
FIG. 3 is a perspective view of the Christmas tree attached to the automobile rooftop mount.
Figure 4:
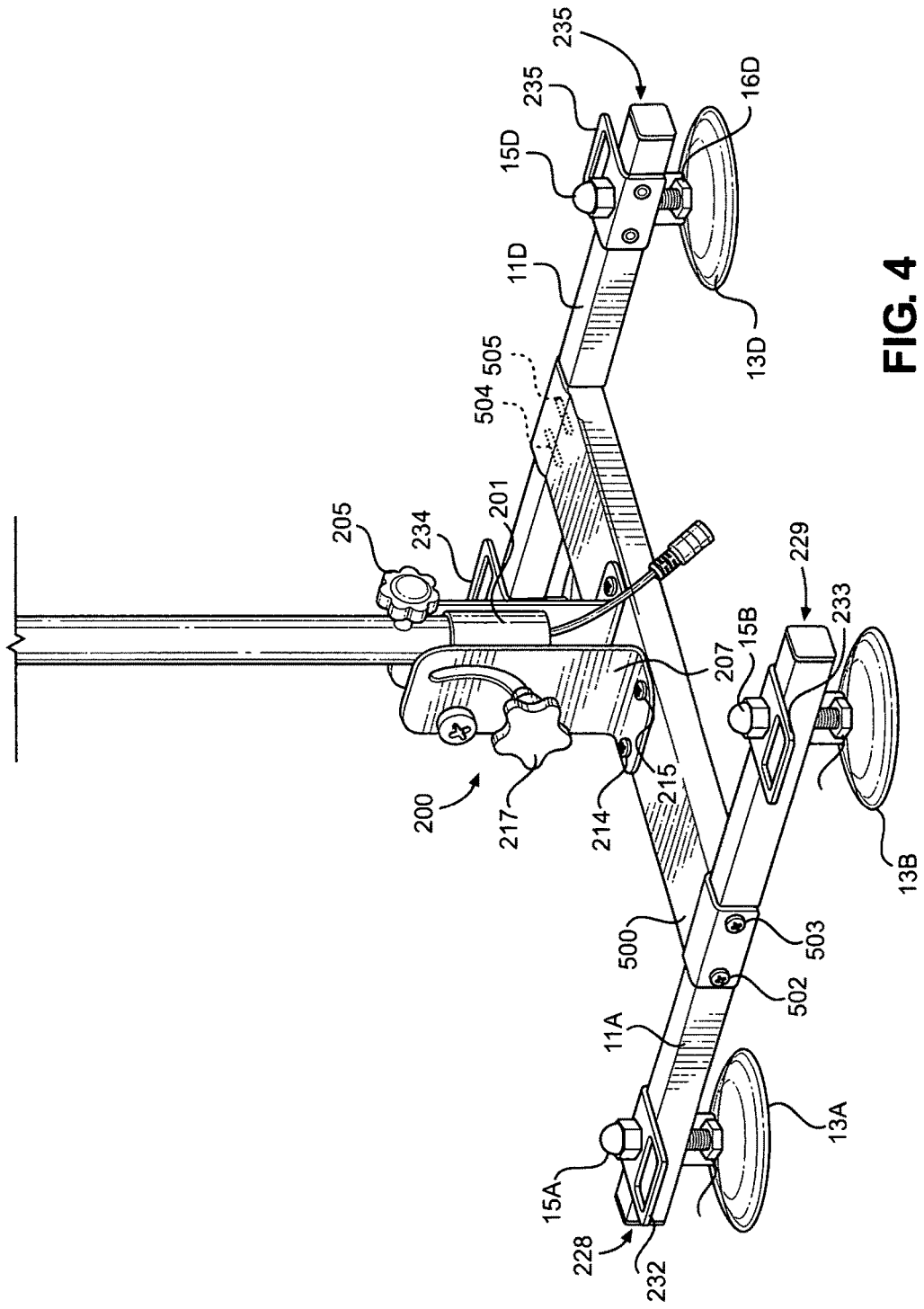
FIG. 4 is a perspective view of an alternative body of the H frame.
Figure 5:
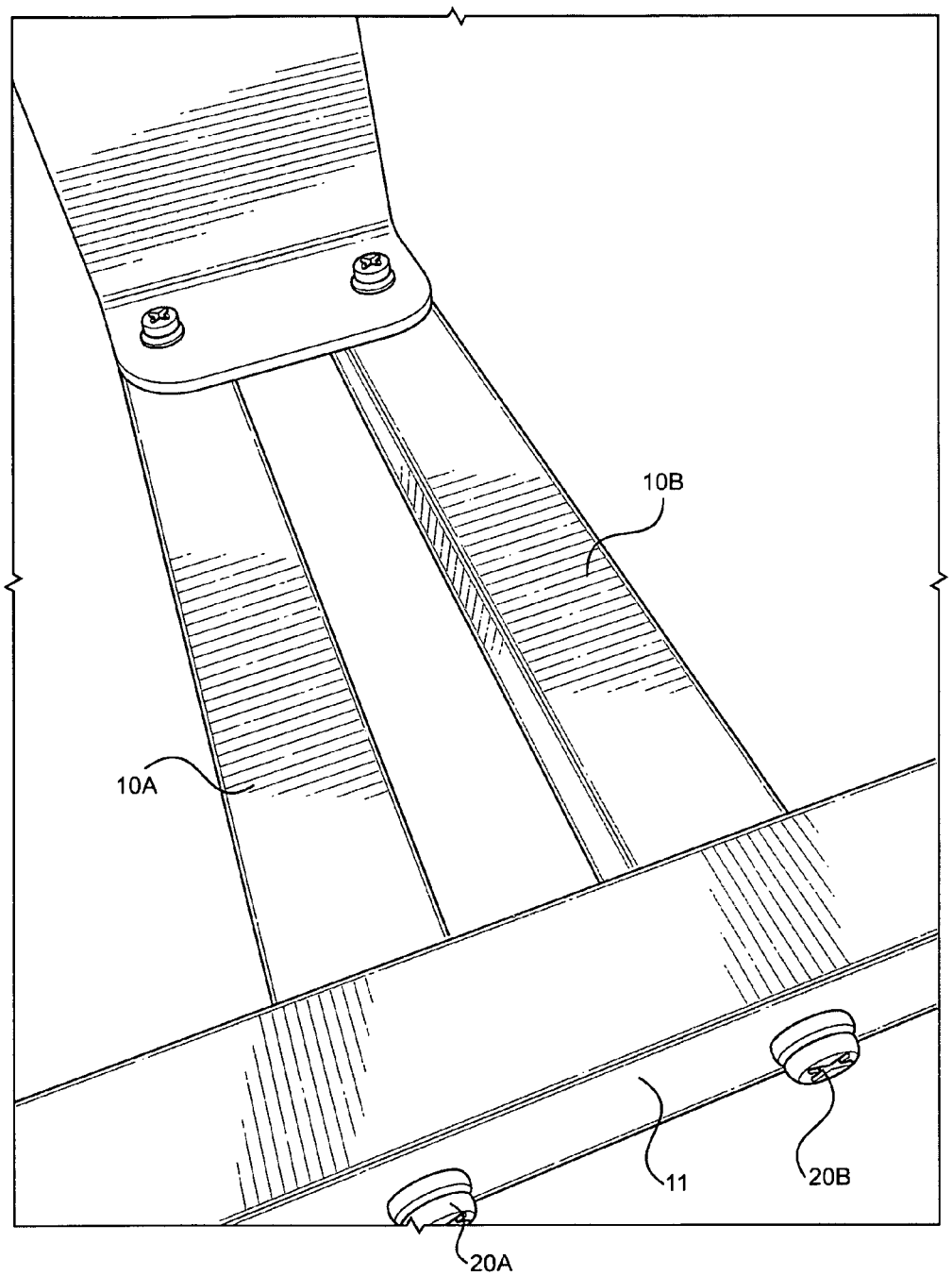
FIG. 5 is a close up perspective view of the H frame.
Figure 6:
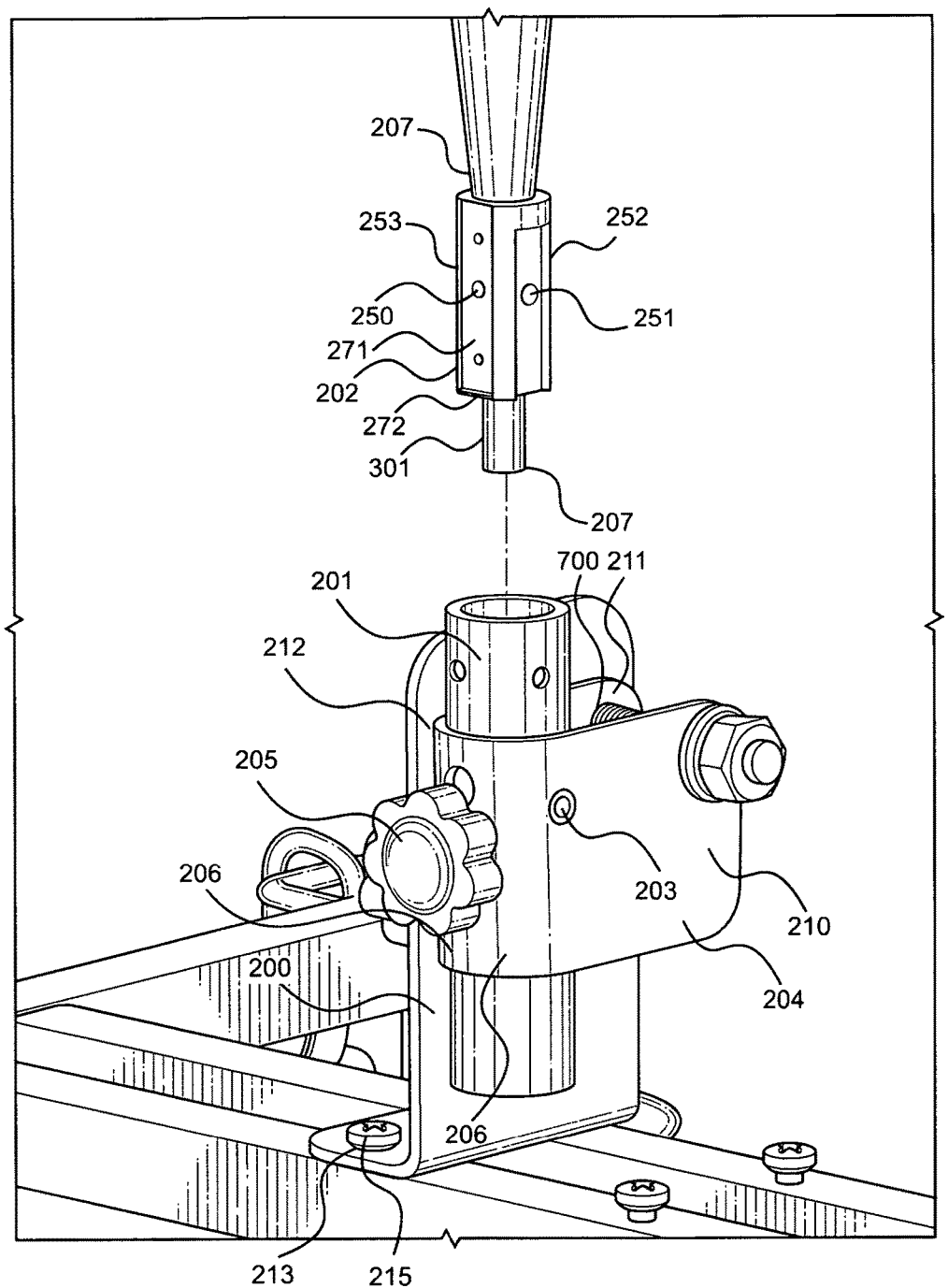
FIG. 6 is a perspective view of the superstructure and the grip.
Figure 7:
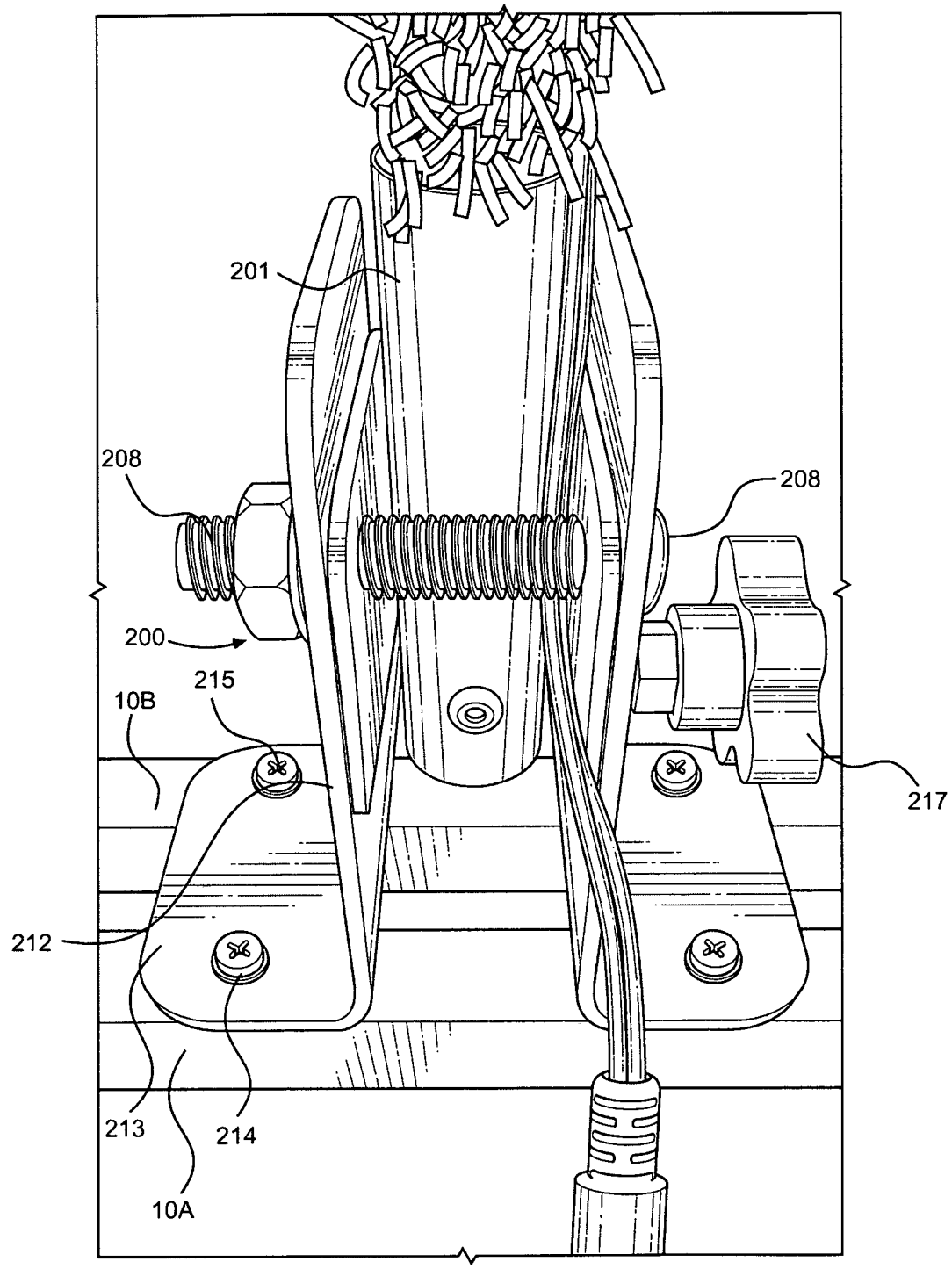
FIG. 7 is a front view of the superstructure and part of the H frame.
Figure 8:
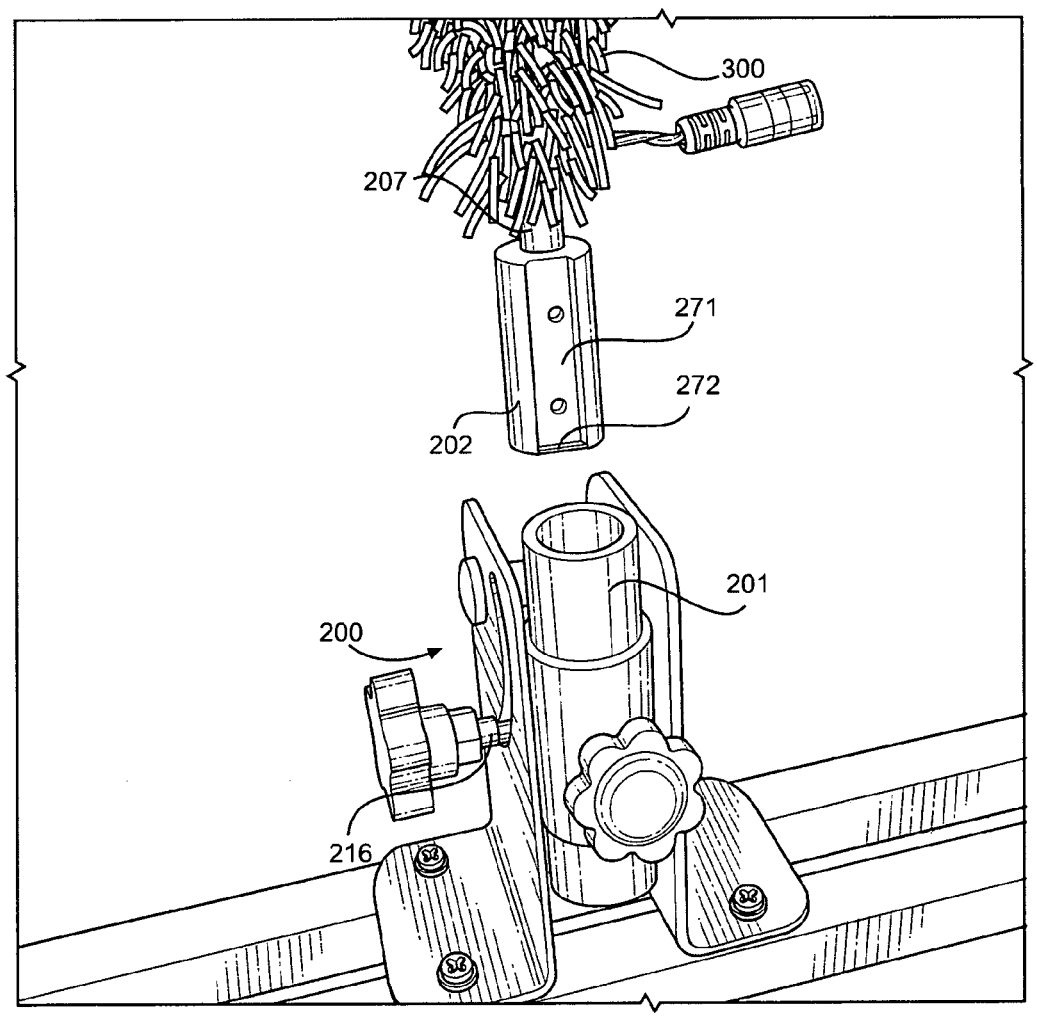
FIG. 8 is a front perspective view of the superstructure.
Figure 9:
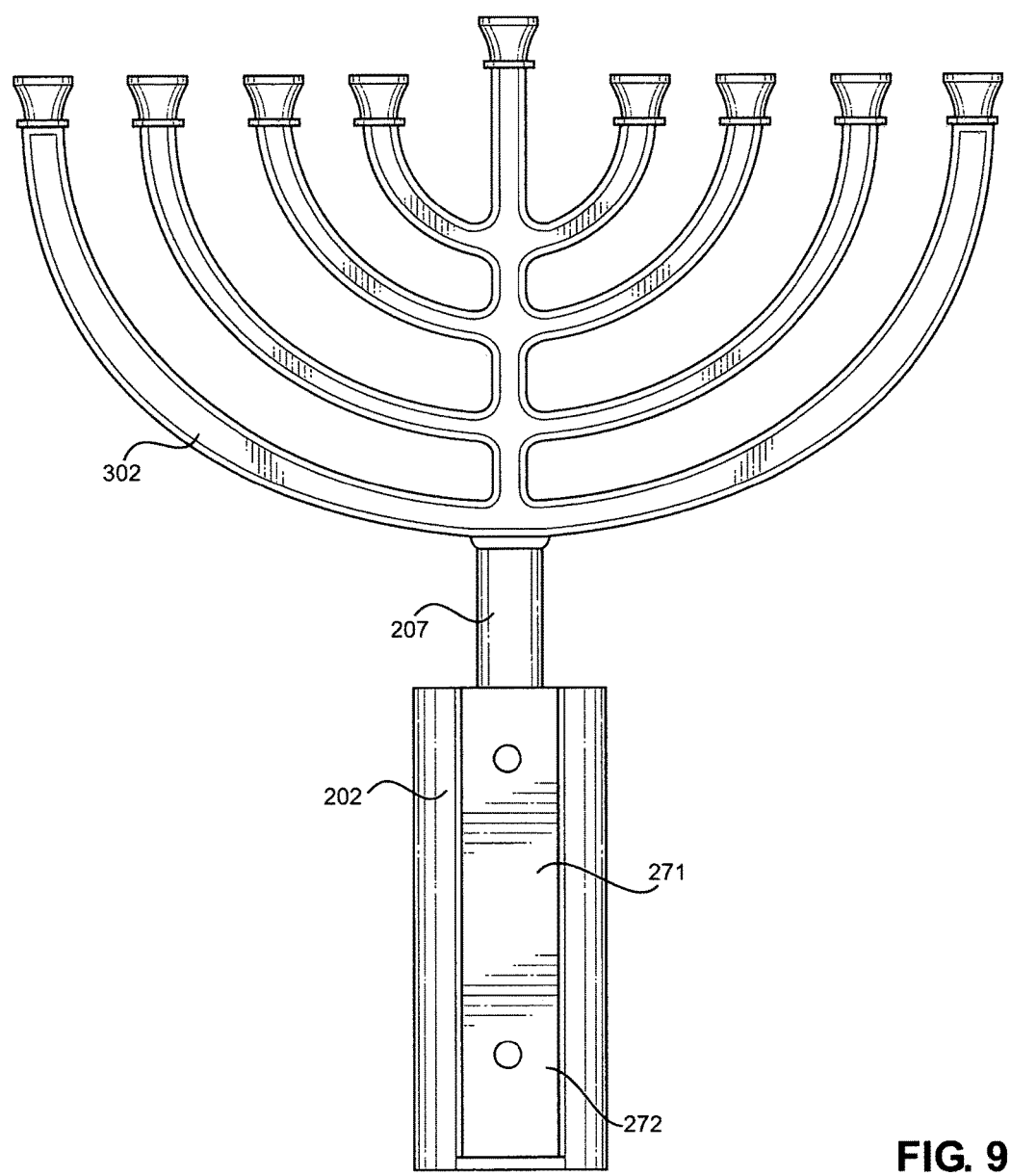
FIG. 9 is a front view of the menorah.
Figure 10:
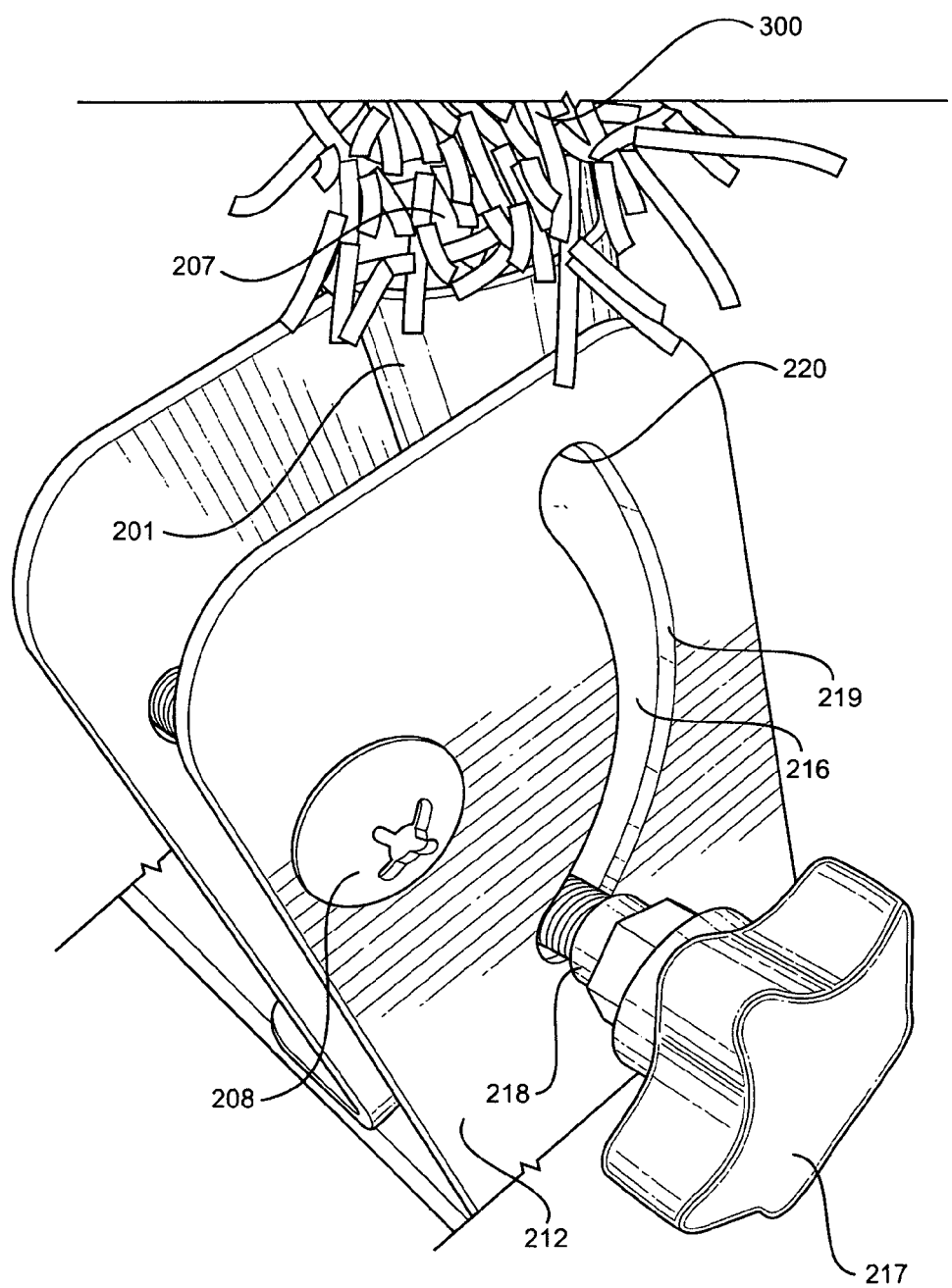
FIG. 10 is a close-up side perspective view of the superstructure.
Figure 11:
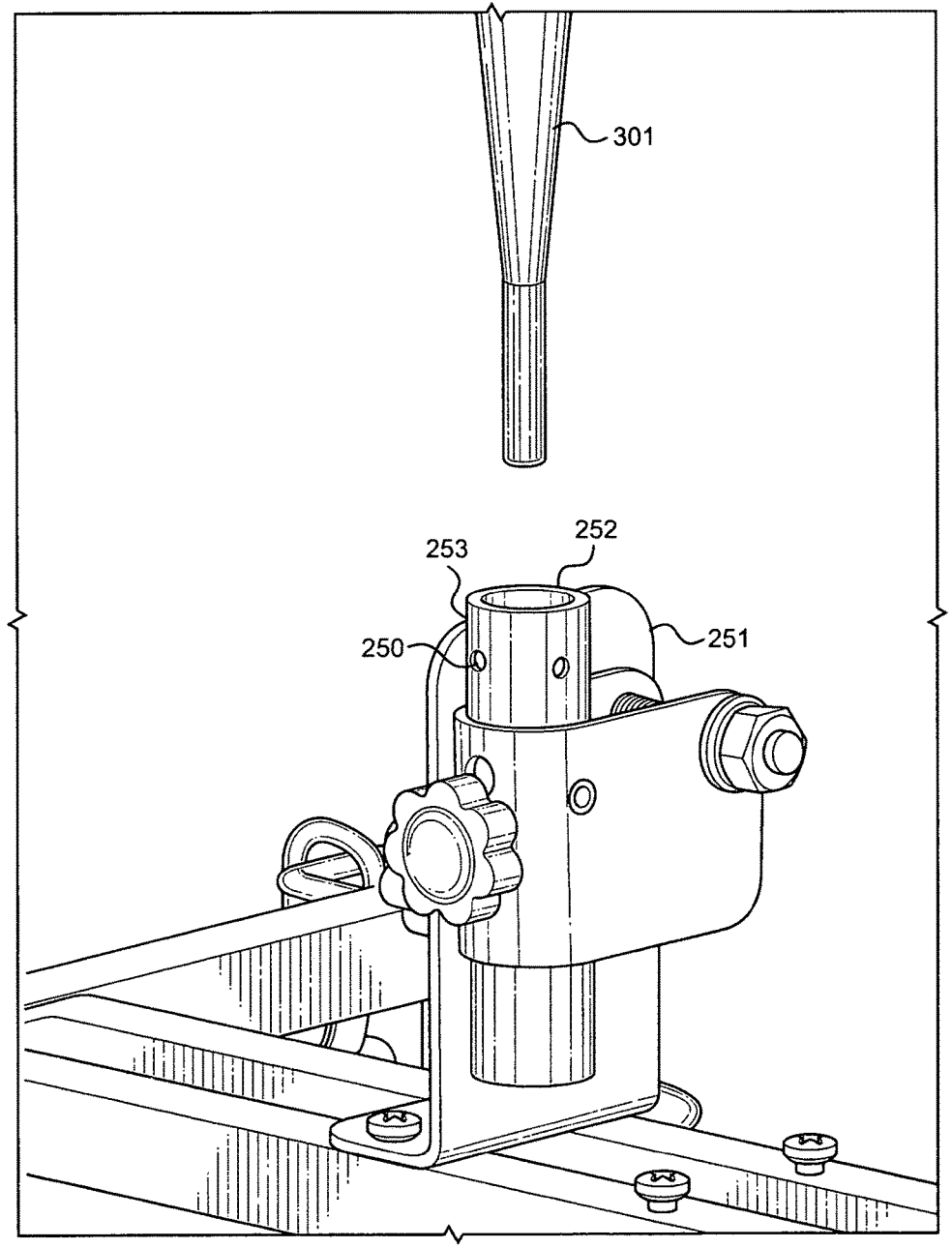
FIG. 11 is a frontal perspective view an alternative embodiment of the connection of the pole mount to the pole.
Figure 12:
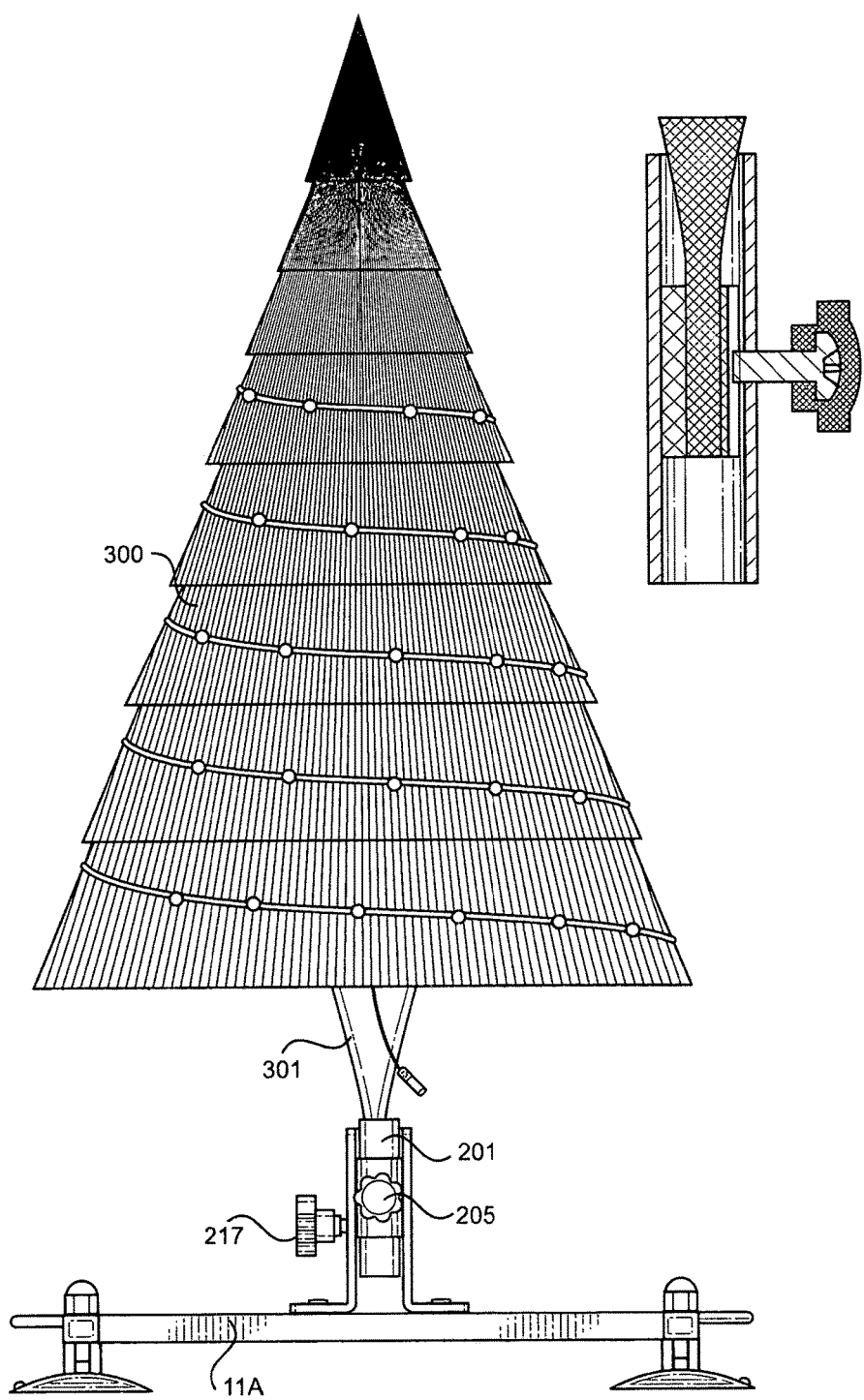
Figure 13:
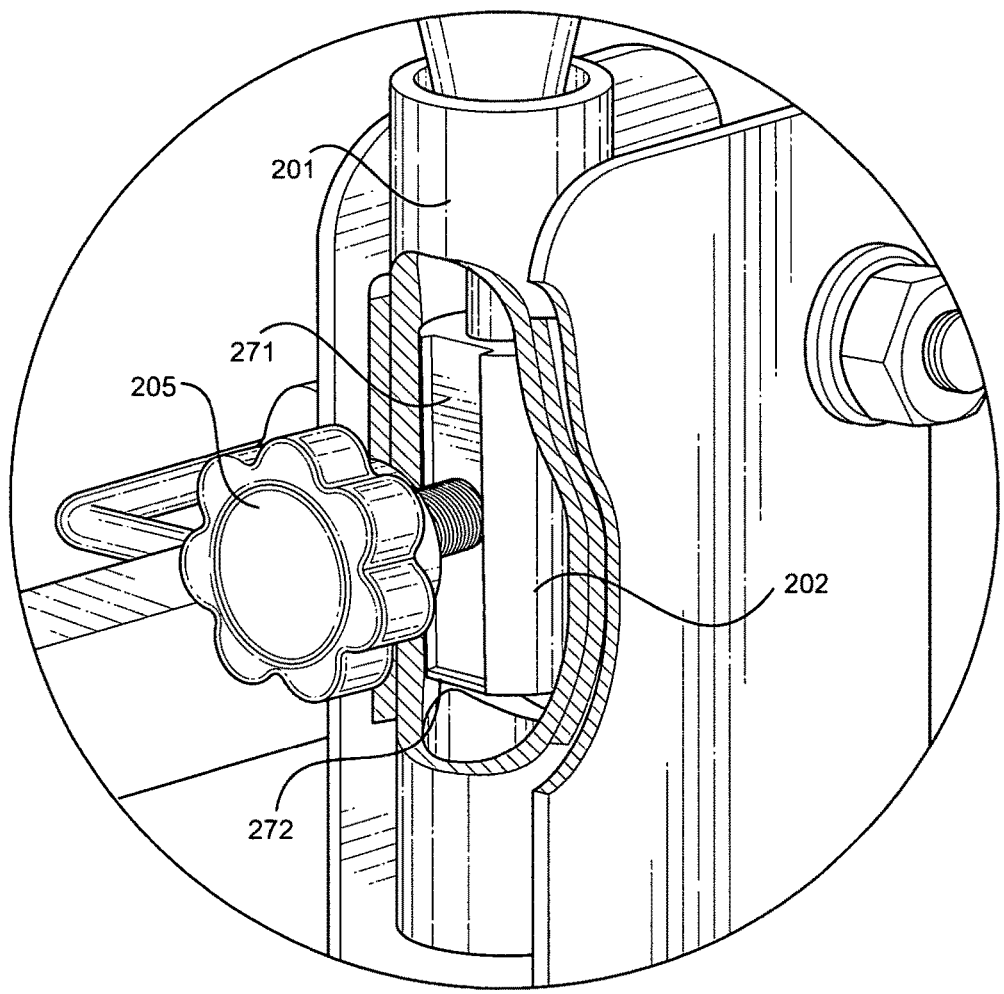
FIG. 13 is a partial cross sectional view of the pole mount.
Figure 14:
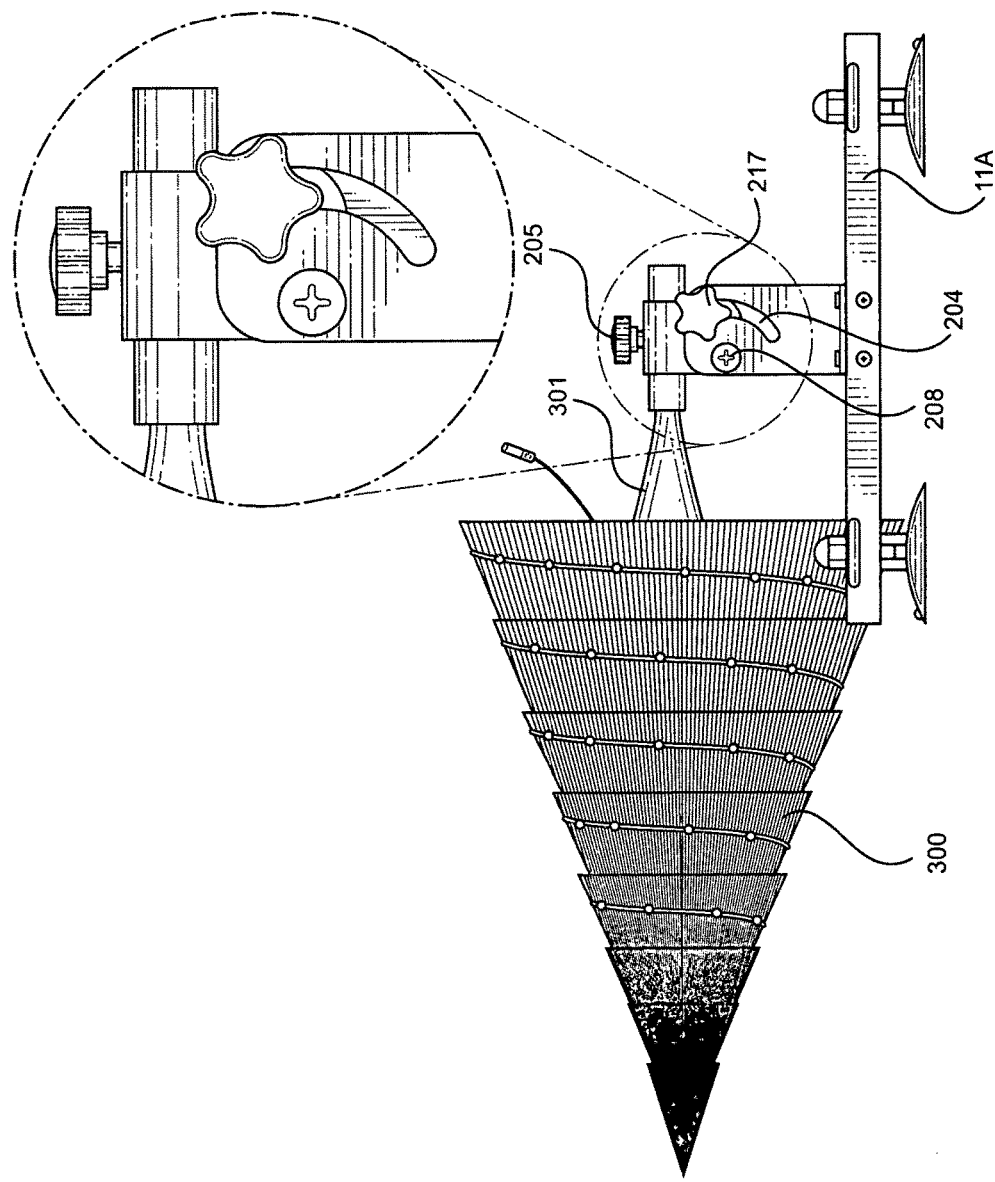
FIG. 14 is a perspective view of the side support bars.
Figure 15:
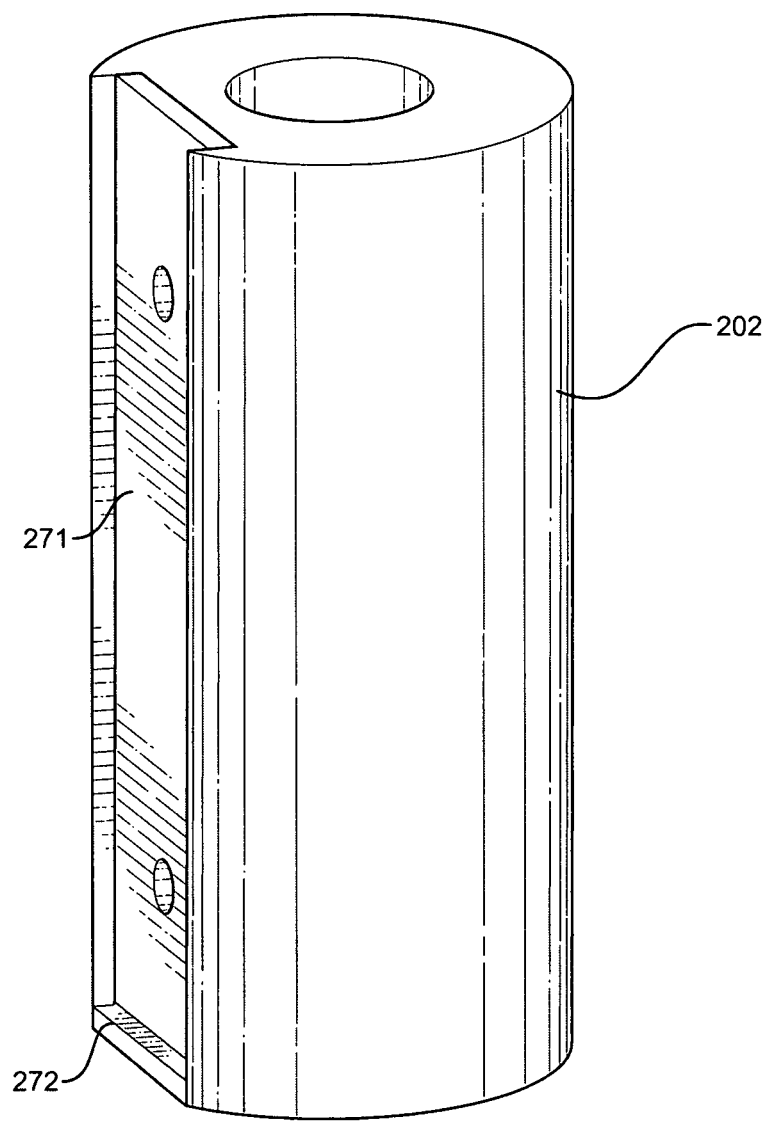
FIG. 15 is a perspective view of the pole grip.
Figure 18:
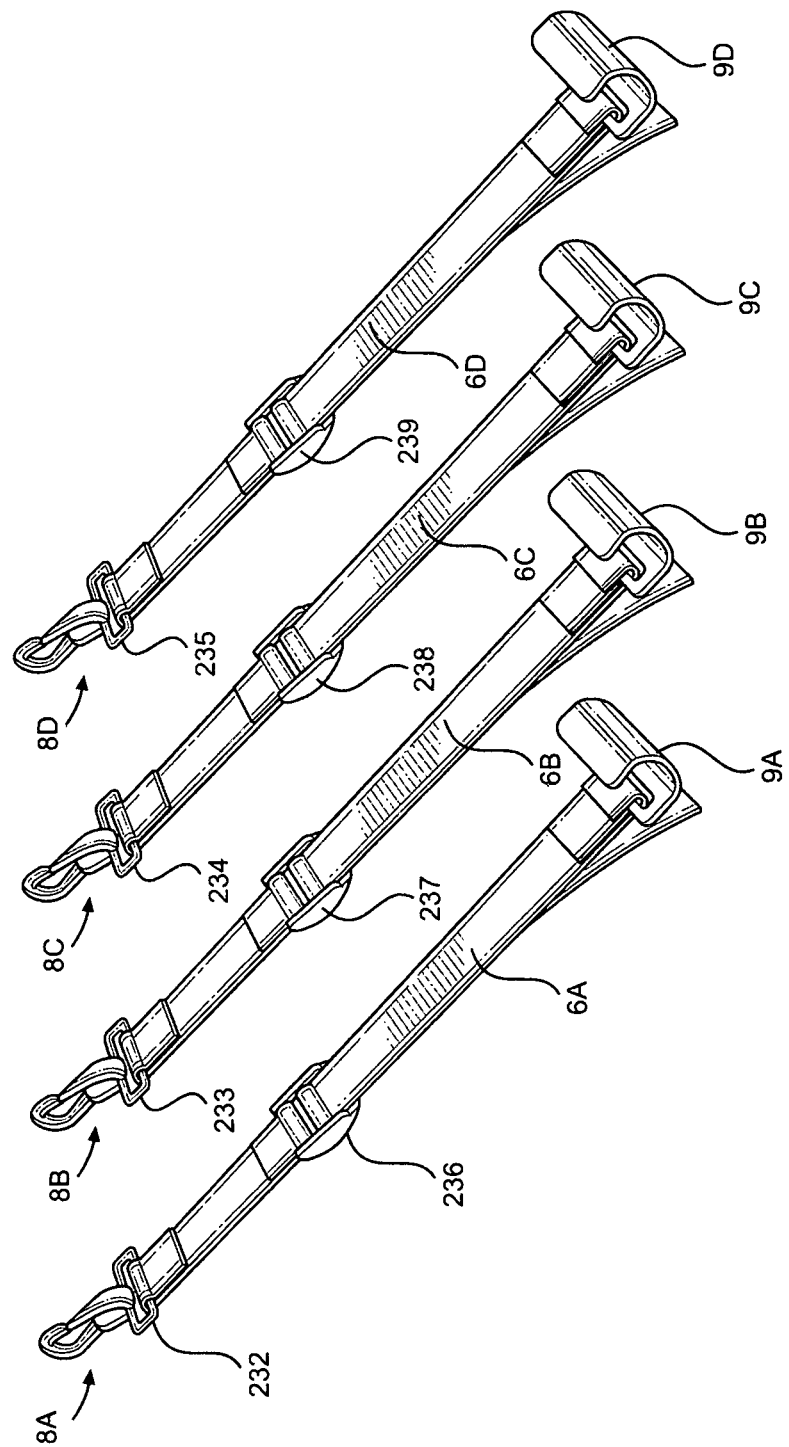
FIG. 18 is a perspective view showing the straps.
Figure 19:
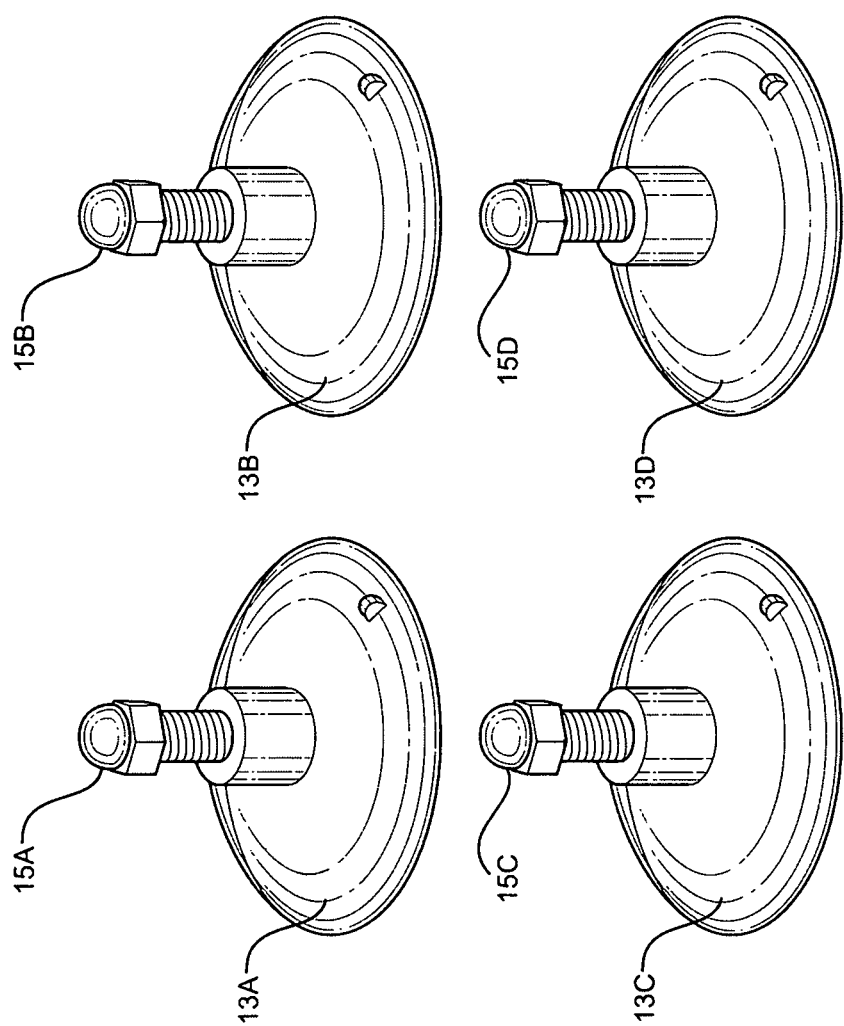
FIG. 19 is a close-up perspective view of the suction cups.
Figure 20:
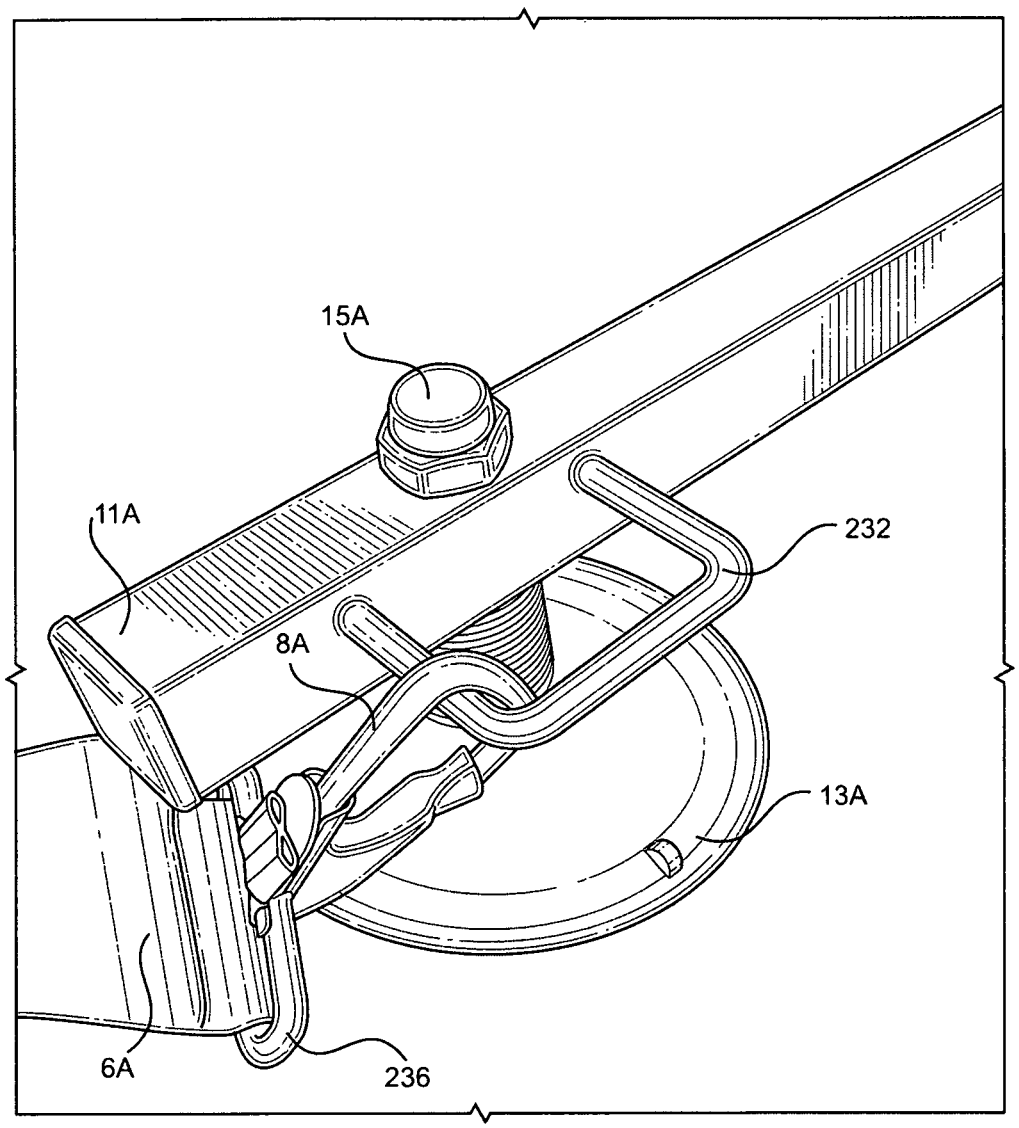
FIG. 20 is a perspective view of the attachment of the straps to the side bar.
Figure 21:
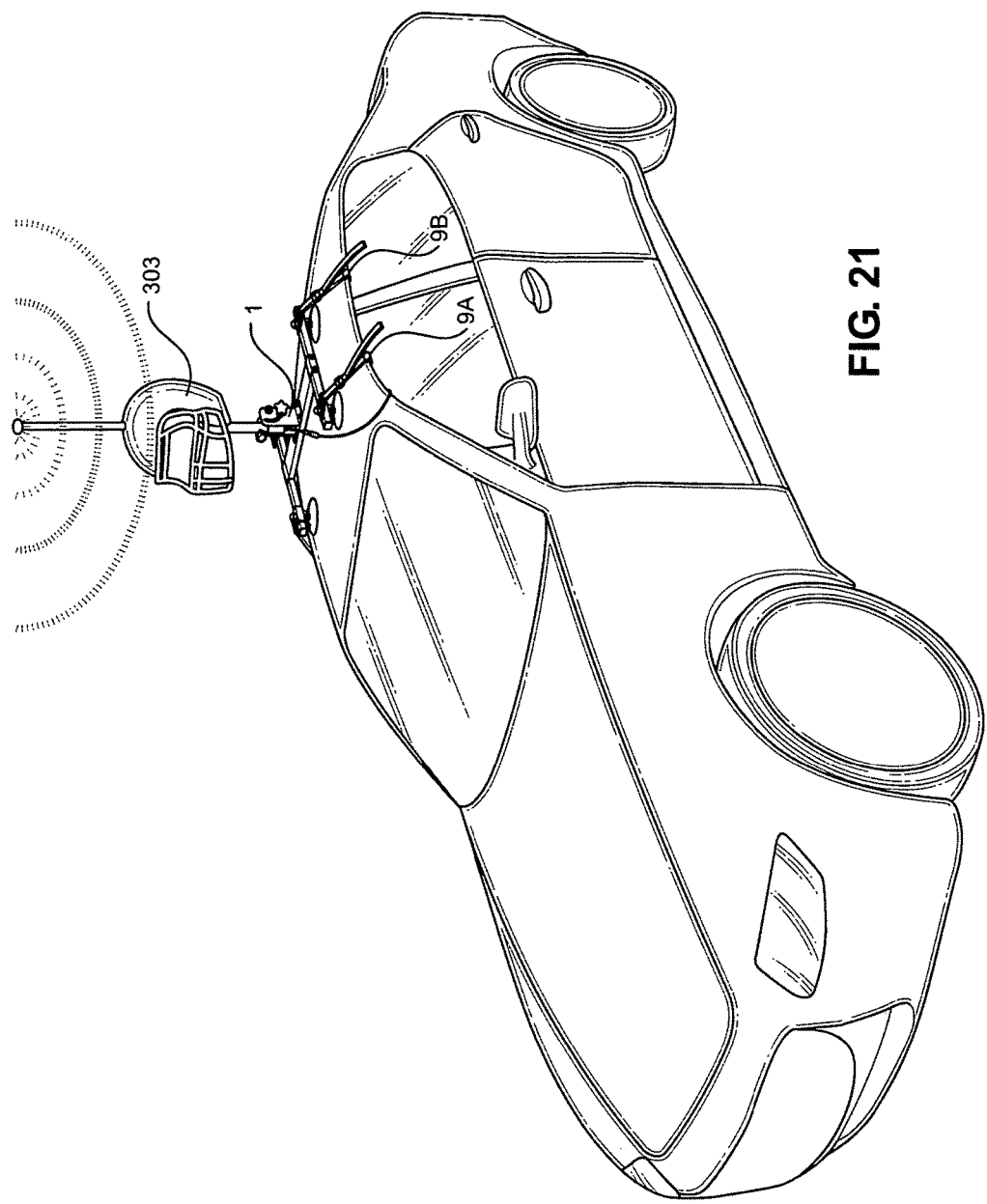
FIG. 21 is a perspective view of a football helmet held on the automobile roof mount.
Figure 22:
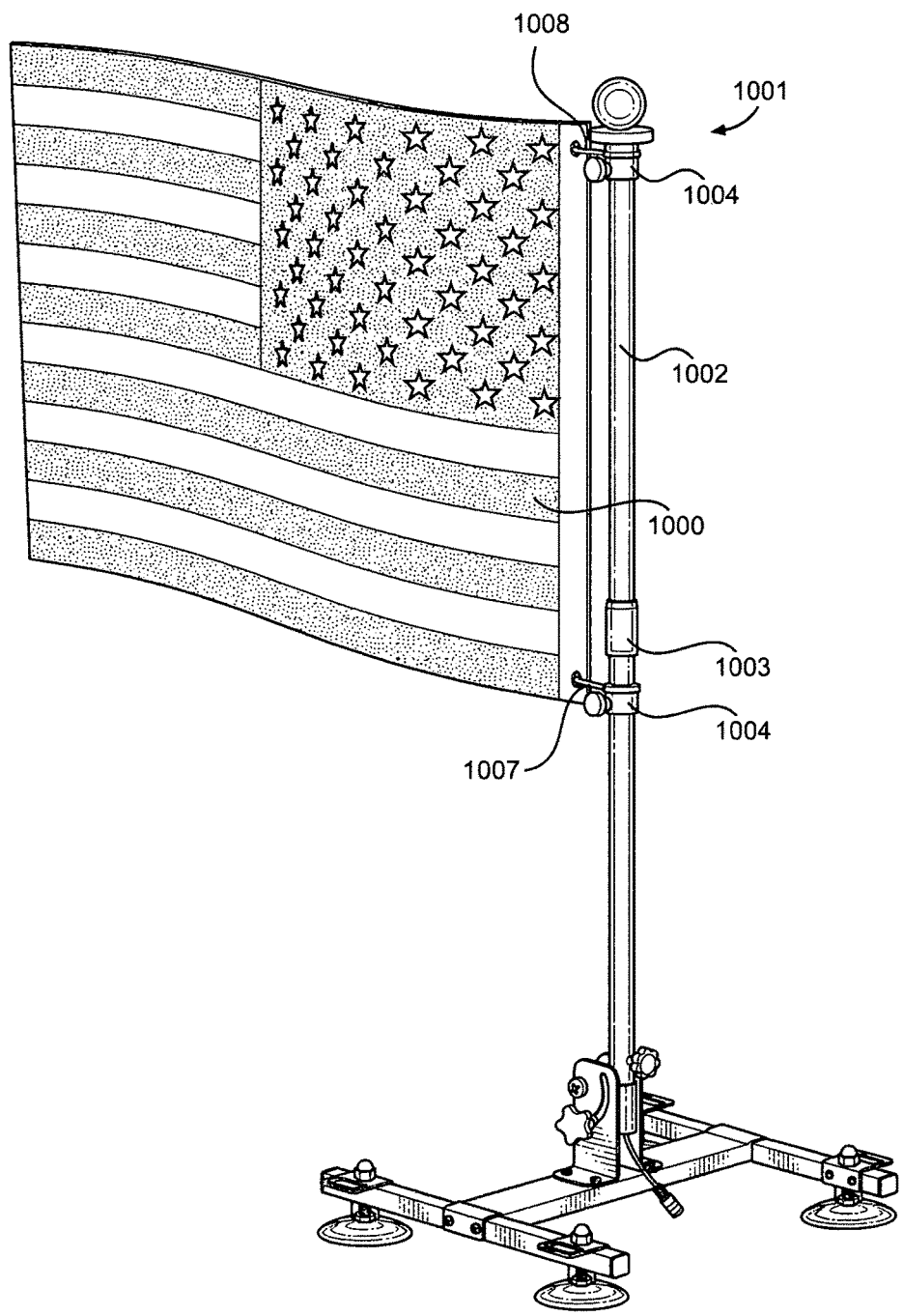
FIG. 22 is a flag display held by the automobile roof mount.

Referring to FIGS. 1-36, the automobile roof top mount 1 comprises a first base side bar 11a and a second base side bar 11b. The two side bars 11a, 11b are parallel to each other and are positioned lengthwise on top of the hood of the automobile. In one embodiment, two side bars 11a, 11b each range in length from about two feet to about five feet. The width of each of the two side bars 11a, 11b is from about 1" to about 3". In one embodiment, the side bars are made out of metal, such as, for example, aluminum and steel, or it could even be made out of strong plastic or wood. In one embodiment, the two side bars 11a, 11b are positioned between two feet and five feet apart, although positioning may fall outside of this range.

At least one cross bar 10a, and in another embodiment at least two cross bars 10a 10b connect and are positioned perpendicularly between the two side bars 11a, 11b by means of screws 20a, 20b, 20c, and 20d, through holes 100a, 100b, 100c, 100d which go through both the side bars 11a, 11b. and the cross bars 10a, 10b. In one alternative embodiment, the cross bars 10a, 10b are welded together. In one embodiment, the cross bars 10a, 10b are bridge square bars. The cross bars 10a, 10b are positioned equidistantly from the center(s) of the side bars, from about one to about four inches apart from each other, The cross bars 10a, 10b are made of the same material as the side bars to prevent any galvanic corrosion. Different materials may be used where these is very little or no galvanic corrosion.

In another embodiment of the disclosure, there is one cross bar 500. This cross bar can range in width from about three to about six inches. This cross bar 500 serves the same function as having two cross bars 10a, 10b. Each end of the cross bar 500 may be held in place at each end of the cross bar by one screw 501 503 or by two screws 502, 503, with each screw traversing one the two side bars 11a, 11b. The materials used are the same materials used when there are two cross bars 10a, 10b.

Connected to the top of and across the two cross bars 10a and 10b or to cross bar 500 is a mount superstructure 200. The mount superstructure 200 comprises a pole mount 201 that can accept pole 207. In one embodiment, pole 207 has a specific complementary bottom grip 202 designed to fit into pole mount. The pole 207 supports a demonstrative structure. For example the pole 207 could be supporting a synthetic Christmas tree (and possibly a real tree) 300, a Menorah 302, an oversized football helmet 303 for tailgate parties, etc. The possibilities are endless. Irregular objects such as oversized football helmets, oversized baseballs, etc. will be supported by a frame (not shown) that is connected to pole 207. In this position, the Christmas tree 300, the Menorah 302, or whatever other object is positioned on an appropriate stand in the vertical position.

The pole mount 201 is held in place by a first screw 203 positioned perpendicularly through a u shaped channel 204 and into the pole mount 201, with a thread screw 205 positioned through the nadir or bottom 206 of the U shaped channel 204 and through the pole mount 201. The thread screw 205 holds the bottom grip 202 of the pole 207 in place. In one embodiment, the bottom grip 202 has on its side a flat section 271, made of metal or any other suitable material, with a lip 272 at the bottom of the flat section. In one embodiment, the flat section is slightly indented into the grip. Thus, when thumb screw 205 is tightened against the flat section, the pole 207 should not be able to fall out of the pivot mount because lip 272 is blocked from upward movement by the end of the thumbscrew. The U shaped channel can be screwed to or welded to the pole mount.

A pivot screw or bolt 208 goes perpendicular through the first side wall 210 of the channel, and then through the second side wall 211 of the u shaped channel 204 and then through the a vertical anchor wall 212 which in turn is attached by a nut 209. The vertical anchor wall 212 is in turn is integrally attached to a foot 213 that is screwed or drilled into the top of the cross bar 500 or two cross bars 10a, 10b using screws 214, 215. Hence, the assemblage of the u shaped channel can freely rotate about the bolt 208.

Furthermore in the vertical anchor wall 212 there is an open track groove 216 allowing the pole 207 in the pole mount 201 to be rotated 90 degrees. Specifically, a side thumb screw 217 is positioned perpendicularly through the groove, and is threaded into positioning screw hole 700 in the second side wall. In one embodiment, the side thumb screw 217 goes through the open track groove 216 and has a shoulder 218 which is secured against the circumference 219 of open track groove 216.

To use the device, the side thumb screw 217 is loosened and the pole mount 201 is raised until perpendicular. A pole 207 fitted with a pole grip 202 is inserted. Also at this point, both of the thumb screws 205 and 217 should be tightened. Tightening thumb screw 205 secures the bottom grip in the pole mount 201.

People may leave the Christmas trees 300, Menorahs, or other items in the rooftop mount 1 throughout the holiday season, but, the tree (or other item on the pole 200) most likely needs to be lowered when the automobile enters a garage. To lower the Christmas tree 300, the side thumb screw 217 is reversibly turned, and the pole mount 201 is rotated pivotally forward about the pivot screw/bolt 208 from the first end of the 221 of the open track groove. 216. The rotation continues until the Christmas tree 300 (or other appropriate object) is rotated forward, and the positioning screw hole 700 is now at the second end 220 of the open track groove 216 whereupon the process can be is repeated.

To make a Christmas tree which will fit into the pole mount 202, the Christmas tree stem 301 (or any item that the user wants), is inserted into the pole grip 202 This stem may fit loosely or snuggly into the pole grip 202. In an alternative embodiment, at least one screw 230 may run perpendicular through the pole grip and can hold the stem 301 in place. In another embodiment, there are four screws 250, 251, 252, 253 which can hold the stem 301 securely in the pole grip 202. In one embodiment, the Christmas tree is artificial.

The device is to be attached to a top of an automobile. This is probably best done prior to mounting the Christmas tree or other display item. In one embodiment, the automobile roof mount 1 has four (4) suction cups 13a, 13b, 13c, 13d, which are positioned on the underside and near the four corners of the base side bars 11a, 11b, each held in place by a screw or bolt 15a, 15b, 15c, 15d which are threaded into circular nut 16a, 16b, 16c, 16d which are affixed to suction cups 13a, 13b, 13c, 13d. The suction cups 13a, 13b, 13c, 13d are used to prevent damage the finish on the automobile, In another embodiment, magnets 17a, 17b, 17c, 17d are positioned in place of suction cups. The magnets can be attached to the underside of base side bars 11a, 11b on the underside in the four corners. The magnets can be attached by any means known in the art. In this embodiment, straps may or may not be used, and as such, there may or may not be a need for the anchors, described infra.

In one embodiment, where suction cups are used, the automobile roof mount 1 is primarily held down by straps 6a, 6b, 6c, 6d, with one strap near each corner 228, 229, 230, 231 of the base side bars 11, 11a. Specifically, on each corner of the base side bars are anchors 232, 233, 234, 235 to which spring hooks 8a, 8b, 8c, and 8d of straps are attached. In another embodiment, the straps 6a, 6b, 6c, 6d have adjustable clips 236, 237, 238, 239. In another embodiment, the straps 6a, 6b, 6c, 6d have a flat hook 9a, 9b, 9c, 9d which hook securely under the top of the window sill frame.

There are a number of accessories and variations to this rooftop mount. The Christmas tree that is one of the options for the rooftop mount, is artificial. In one embodiment, a set of electric lights on the tree can be illuminated by having the electrical cord 910 of the lights attached to an adapter 260 which could be plugged into the vehicle's lighter. In another embodiment, for more modern automobiles, the electrical cord could be attached to a USB plug 261 which can be plugged into a automobile's USB port Similarly, a specialized menorah 302 have the same attachment accoutrements can be placed on top of the automobile and plugged in.

Other devices that can be attached to the roof of the automobile include oversized football and baseball helmets, sporting equipment, etc, as long as the attachment mechanism complements the roof top mount. Any of the items can be illuminated or motorized to rotate about the stem. Sporting equipment can come in a team's colors, or can be white so that decals can be applied. There can be illumination above or in the football or sporting equipment. In one embodiment, bars (not shown) attached to the pole 207 through bar holes 500 are shaped to s support the item being held, whether it is a football helmet or a baseball helmet. These items may be the actual items or may in fact be artistic replicas.

The automobile rooftop mount can also be used to fly a flag 1000 and can operate the same way as that of the Christmas tree. Illumination of the flag can be done in the same manner that the Christmas tree is illuminated, except illumination 1001 will be from above the flag. The flag can be a cloth flag, or a plastic or framed flag. The pole 1002 can be adjustable 1003 by methods and devices known in the art. Metal ring clips 1004, 1005 can hold the flag to the pole 102 with a connection by a spring clip 1007, 1008. In another embodiment, illumination may come from within an electronic flag or from the frame.

Furthermore, depending on the size of the item being mounted on the roof, there can be two sets of cross set bars, each set with its own support bar superstructure 400. The sign can be a full LED display sign, can be illuminated by LED lights, can have displays, text, animation, videos, etc. The sign can be programmable with a Wi-Fi, USB port, G3 or computer, or even by a cell phone. Electronic contacts can be on the outside of the support bar superstructure, or the support bar superstructure and internally include the electronic contacts.

In yet another embodiment, the support bar superstructure supports an electronic rotating mount that allows one to a video camera filming footage safely on top of the automobile roof. In one embodiment, the mount is motorized and in another embodiment, the mount is voice activated by use of a wireless microphone in the automobile.

In one embodiment, in those cases where electrical lights or other devices where a switch may be desirable, wireless connections are available for communicating commands to the items supported by the automobile rooftop mount.

Furthermore, Christmas tree lights and other such items requiring power can use batteries, if, for whatever reason, the person does not want to plug the light plug into the USB port or cigarette lighter. Any electronic adaptation is, in the various embodiments, available for use.

To use the Place the H base on the side support bars facing front and back of the automobile, and the other thumb screw facing towards the front of the automobile, centered on the roof of the vehicle.

Attach the spring hooks from the straps to each of the four wire loops on the side support bars. Attach the open clip (Flat hook) to the door frames weather molding. Repeat for the other clips. Secure the four tether straps. Plug the automobile adapter into the vehicle's lighter. If the operator of the vehicle wants to lower the Christmas tree, the side thumb screw is loosened and the tree is lowered.

Although the disclosure has been illustrated and described in detail in the drawings and foregoing description, the same is to be considered as illustrative and not restrictive in character—it being understood that the embodiments shown and described have been selected as representative examples including presently preferred embodiments plus others indicative of the nature of changes and modifications that come within the spirit of the disclosure(s) being disclosed and within the scope of disclosures(s) as claimed in this and any other applications that incorporate relevant portions of the present disclosure for support of those claims. Undoubtedly, other "variations" based on the teachings set forth herein will occur to one having ordinary skill in the art to which the present disclosure most nearly pertains, and such variations are intended to be within the scope of the present disclosure and of any claims to disclosure supported by said disclosure.

What is claimed is:

1. A removable rooftop mount attachable to an automobile rooftop, said removable rooftop mount comprising: a) a first base side bar; b) a second base side bar, said first and said second base side bars parallel to each other and are positionable lengthwise on top of said automobile rooftop; c) at least one cross bar, said at least one cross bar comprising: i) a first end; and ii) a second end; said at least one cross bar positioned perpendicular with said first end of said at least one cross bar attached to said first base side bar and said second end of said at least one cross bar attached to said second base side bar; d) a superstructure mounted to the at least one cross bar, said superstructure comprising: i) a pole mount comprising a U-shaped channel into which the pole mount fits and is attached, said U-shaped channel comprising: aa) a first side wall; bb) a second side wall; cc) a U-shaped bottom channel, said U-shaped bottom channel connecting at one end to said first side wall and at another end to said second side wall; dd) a first thread screw positioned at a bottom of the U-shaped channel, said first thread screw going through the U-shaped channel; ii) a first anchor wall, said first anchor wall comprising: aa) a first vertical anchor wall, said first vertical anchor wall comprising a first curved opening; and bb) a first outwardly positioned horizontal foot extending from and integral with said first vertical anchor wall, said first outwardly positioned horizontal foot parallel with and attached to said at least one cross bar; iii) a second anchor wall, said second anchor wall comprising: aa) a second vertical anchor wall, said second vertical anchor wall comprising a second curved opening; bb) a second outwardly positioned horizontal foot extending from and integral with said second vertical anchor wall said second outwardly positioned horizontal foot parallel with and attached to said at least one cross bar; iv) a pivot screw or bolt positioned perpendicular through: aa) the first side wall of the U-shaped channel; bb) a second side wall of the U-shaped channel; cc) said first vertical anchor wall; and dd) said second vertical anchor wall: and v) a side thumb screw, said side thumb screw comprising a shoulder to clamp down on circumference of the first and second curved opening to lock the pole mount in position, said side thumb screw positioned through said first and second curved opening and threaded into said second side wall of the U-shaped channel; e) a plurality of feet, each plurality of said feet attached on an underside of each end of the first base side bar and the second base side bar.

2. The removable rooftop mount of claim 1, further comprising a second cross bar.

3. The removable rooftop mount of claim 2, wherein said superstructure is attached to both said at least one cross bar and said second cross bar.

4. The removable rooftop mount of claim 1, wherein there is only one said at least one cross bar to which said superstructure is attached.

5. The removable rooftop mount of claim 1, wherein said plurality of feet comprise magnets.

6. The removable rooftop mount of claim 1, wherein said plurality of feet comprise suction cups.

7. The removable rooftop mount of claim 1, further comprising a plurality of straps, wherein each of said plurality of straps comprising: a) a first end; b) a second end; said first end of said each of said plurality of straps connected to one end of one of said base side bars, and said second end of said each of said plurality of straps are removably connectable to a window frame of an automobile.

8. The removable rooftop mount of claim 1, further comprising a pole, said pole further comprising a first end and a second end, said first end further comprising a bottom grip allowing for secure position of said pole within said pole mount.

9. The removable rooftop mount of claim 8, further comprising a flat side on said bottom grip.

10. The removable rooftop mount of claim 8, further comprising a Christmas tree positioned at the second end of said pole.

11. The removable rooftop mount of claim 8, further comprising a Menorah positioned at the second end of said pole.

12. The removable rooftop mount of claim 10, further comprising lights on said Christmas tree.

13. The removable rooftop mount of claim 12, further comprising a plug leading from said Christmas tree lights to an outlet in an automobile.

14. The removable rooftop mount of claim 11, further comprising lights on said Menorah.

15. The removable rooftop mount of claim 14, further comprising a plug leading from said Menorah lights to an outlet in the automobile.

* * * * *